C. W. SAENGER.
SERVING TABLE.
APPLICATION FILED NOV. 22, 1911.
1,056,062.
Patented Mar. 18, 1913.
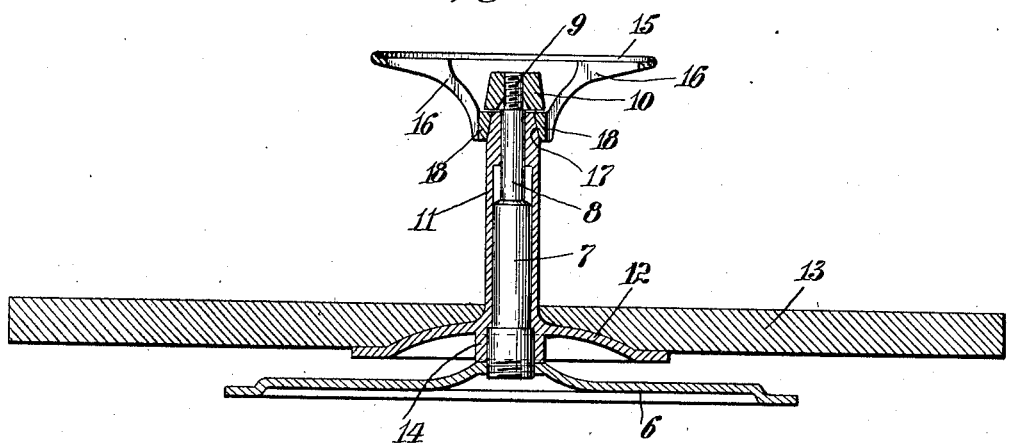
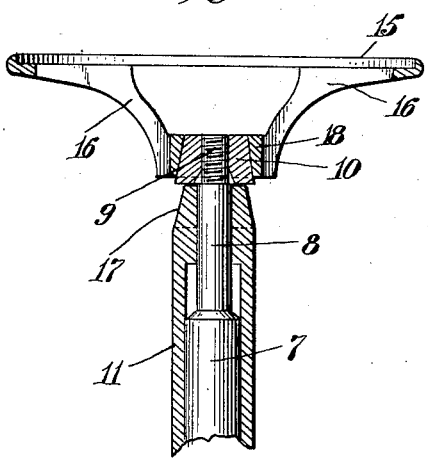
Attest:
Charlotte W. Saenger
Inventor:
by
Atty
COLUMBIA PLANOGRAPH CO., WASHINGTON, D. C.

UNITED STATES PATENT OFFICE.

CHARLOTTE W. SAENGER, OF NEW YORK, N. Y.

SERVING-TABLE.

1,056,062. Specification of Letters Patent. Patented Mar. 18, 1913.

Application filed November 22, 1911. Serial No. 661,652.

*To all whom it may concern:*

Be it known that I, CHARLOTTE W. SAENGER, a citizen of the United States, residing at New York city, in the county and State of New York, have invented certain new and useful Improvements in Serving-Tables, of which the following is a specification.

This invention relates to serving stands, such as are adapted to be placed in the center of a dining table to provide a rotatable support for the usual containers of certain articles, such as salt, pepper and other condiments, to facilitate self-service by those seated around the table.

My invention will be readily understood by reference to the accompanying drawings, forming a part of this specification, in which—

Figure 1 is a central sectional elevation of a serving table or stand embodying my invention, and Fig. 2 is a similar view of the upper portion of the same with the parts in a different position of adjustment, for purposes which will be hereinafter explained.

Referring now to the drawings in detail, numeral 6 designates a suitable base which is preferably of metal or other material heavy enough and of sufficient dimensions to give stability to the stand. At the center of this base 6 is mounted the stud or spindle 7, the upper portion 8 of which is preferably reduced in diameter, and which is provided with the screw-threaded portion 9 at its top for the reception of the nut 10. Upon the spindle 7 is journaled the tubular or cylindrical portion of the member 11, the bottom 12 of which is flared to provide a support for the preferably circular shelf or platform 13, this platform being secured to the support 12 therefor in any suitable and desired manner. A washer 14 is interposed between the base 6 and the bottom of the member 11, whereby said platform 13 is held at a slight distance above the base 6 and is rotatable on the spindle 7.

In addition to the platform 13, I provide an auxiliary or supplemental shelf or platform 15, also of preferably circular configuration, supported by the braces 16 16 projecting from the collar 18 the bore of which is conical to correspond to the cone-shaped top 17 of the member 11 upon which said collar may be mounted. The nut 10 may be screwed down upon the threaded end 9 of the spindle 7 to secure the platform 15 in place and yet permit rotation thereof with the platform 17.

It may be desired, at times, to retain the platform 15 in a stationary condition while the platform 13 is rotatable as described; as, for instance, when a pot of flowers, a vase, a piece of statuary, or other decoration, is placed upon this platform. For this purpose, I make the nut 10 of conical configuration and of substantially the same dimensions as the conical top 17 of the member 11. It will be apparent, therefore, that I may first screw the nut down upon the threaded portion of the spindle 7 and then mount the collar 18 on the nut 10, as shown in Fig. 2. It will be apparent that under these conditions the platform 15 will not rotate, although the platform 13 is rotatable in the manner described.

I claim as new and desire to secure by Letters Patent:

1. In a serving table, the combination, with a suitable supporting base, of a platform rotatively mounted upon said base, and supplemental platform above said first-mentioned platform, and connecting means between said base and said platform the parts of which are interchangeable, whereby the upper platform may be positively rotated by or remain stationary during rotation of the lower platform.

2. In a serving table, the combination, with a suitable supporting base, and a spindle centrally mounted thereon, of a member rotatively mounted on said spindle, a platform carried at the lower end of said member, a nut screw-threaded on the upper end of said spindle, a second platform, and means whereby said second platform may be mounted on the upper end of said rotating member or on said nut, as may be desired.

3. In a serving table, the combination, with a suitable supporting base, and a spindle centrally mounted thereon, of tubular carrying member rotatively mounted on said spindle, a platform mounted at the lower end of said carrying member, a second platform, and a nut screw-threaded on the upper end of said spindle, the top of said carrying member and said nut being of correspondingly tapering configurations and said second platform being provided with a support having a correspondingly tapering bore, whereby said second platform may be mounted either upon said carrying member or upon said nut.

In testimony of the foregoing, I have, hereunto set my hand in the presence of two witnesses.

CHARLOTTE W. SAENGER.

Witnesses:
AARON GINSBURG,
MILTON G. BUCHDAHL.

Copies of this patent may be obtained for five cents each, by addressing the "Commissioner of Patents, Washington, D. C."